(12) United States Patent
Tobita et al.

(10) Patent No.: US 7,132,499 B2
(45) Date of Patent: Nov. 7, 2006

(54) POLYESTER RESIN CONTAINER WITH IMPROVED WEATHERABILITY

(75) Inventors: Etsuo Tobita, Saitama (JP); Yoshinori Negishi, Saitama (JP); Takahiro Horikoshi, Saitama (JP)

(73) Assignee: Asahi Denka Co., Ltd., Tokyo (JP)

( * ) Notice: Subject to any disclaimer, the term of this patent is extended or adjusted under 35 U.S.C. 154(b) by 0 days.

(21) Appl. No.: 11/131,298

(22) Filed: May 18, 2005

(65) Prior Publication Data

US 2005/0282995 A1    Dec. 22, 2005

(30) Foreign Application Priority Data

Jun. 16, 2004    (JP)    ............... 2004-178048

(51) Int. Cl.
*C08G 63/00* (2006.01)
(52) U.S. Cl. ............... 528/272; 264/176.1; 264/219; 428/34.1; 428/35.7; 428/36.5; 528/190; 528/193; 528/271
(58) Field of Classification Search ............ 428/34.1, 428/35.7, 36.5; 528/190, 193, 271, 272; 264/176.1, 219
See application file for complete search history.

(56) References Cited

U.S. PATENT DOCUMENTS

2004/0241111 A1* 12/2004 Lazzari et al. ............ 424/59
2005/0075465 A1* 4/2005 Bolle et al. ............... 525/437

FOREIGN PATENT DOCUMENTS

| EP | 1 384 749 | 1/2004 |
|---|---|---|
| JP | 2000-238857 | 9/2000 |
| JP | 2001-302926 | 10/2001 |
| JP | 2002-38027 | 2/2002 |
| JP | 2003-192830 | 7/2003 |
| JP | 2003-261725 | 9/2003 |
| JP | 2003-292670 | 10/2003 |

\* cited by examiner

*Primary Examiner*—Terressa Boykin
(74) *Attorney, Agent, or Firm*—Young & Thompson

(57) ABSTRACT

A polyester resin container with improved weatherability as well as colorlessness and heat resistance, made of a polyester resin composition comprising (A) 100 parts by weight of a polyester resin and (B) 0.01 to 10 parts by weight of a triazine ultraviolet absorber represented by formula (I):

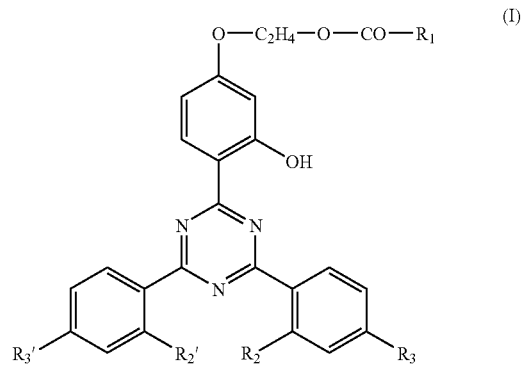

wherein $R_1$ represents a straight-chain or branched alkyl group having 1 to 17 carbon atoms, which may have an alicyclic group at the terminal or in the chain thereof; and $R_2$, $R_2'$, $R_3$, and $R_3'$ each represent a hydrogen atom or a methyl group.

3 Claims, No Drawings

POLYESTER RESIN CONTAINER WITH IMPROVED WEATHERABILITY

TECHNICAL FIELD

This invention relates to a polyester resin container made of a polyester resin composition containing a specific ultraviolet absorber. More particularly, it relates to a polyester resin container excellent in heat resistance, colorlessness, and weatherability which is obtained from a polyester resin composition containing a specific triazine compound as an ultraviolet absorber. The polyester resin container of the invention is suitable as a food packaging container requiring heat sterilization, such as a soft drink bottle.

BACKGROUND ART

Polyethylene terephthalate (PET) containers have been widely used as beverage bottles and containers for cosmetics, medicines, detergents, shampoos, and so on because of high transparency, gas barrier properties, and the like.

Although food packaging containers are rarely left outdoors for a long time and therefore not required to have high weatherability, they are usually kept on the grocery or supermarket shelves under sunlight or fluorescent lights and are required to have weatherability enough to keep the product's appeal to consumers.

Among known methods of light stabilizing various synthetic resins is addition of additives, such as ultraviolet absorbers, phenol or phosphorus antioxidants, and hindered amine stabilizers. Triazine compounds are known as highly effective ultraviolet absorbers and are disclosed, for example, in JP-A-2000-238857, JP-A-2001-302926, JP-A-2003-192830, and JP-A-2003-261725.

DISCLOSURE OF THE INVENTION

An object of the present invention is to provide a polyester resin container with improved weatherability and, in addition, sufficient colorlessness and excellent heat resistance.

As a result of extensive investigations, the present inventors have found that the above object is accomplished by adding to a polyethylene terephthalate resin a triazine ultraviolet absorber having a specific structure. The present invention has been reached based on this finding.

The present invention provides a polyester resin container made of a polyester resin composition comprising (A) 100 parts by weight of a polyester resin and (B) 0.01 to 10 parts by weight of a triazine ultraviolet absorber represented by formula (I):

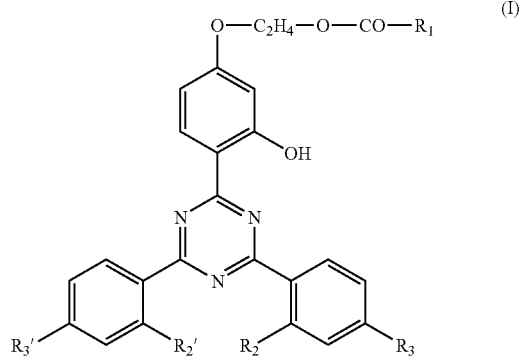

(I)

wherein $R_1$ represents a straight-chain or branched alkyl group having 1 to 17 carbon atoms, which may have an alicyclic group at the terminal or in the chain thereof; and $R_2$, $R_2'$, $R_3$, and $R_3'$ each represent a hydrogen atom or a methyl group.

DETAILED DESCRIPTION OF THE INVENTION

The polyester resin as component (A) that can be used in the present invention typically includes polyethylene terephthalate used as a general-purpose bottle material. Also included is polyethylene naphthalate that is expensive but known as a material of returnable/refillable bottles.

The polyethylene terephthalate for use in the invention can be obtained by, for example, using terephthalic acid and ethylene glycol as main monomer components and, if desired, other monomer components, including dicarboxylic acid components such as isophthalic acid and naphthalenedicarboxylic acid, oxycarboxylic acid components such as p-hydroxybenzoic acid and hydroxynaphthalenecarboxylic acid, and diol components such as cyclohexanedimethanol, bisphenol A ethylene oxide adducts, bisphenol S ethylene oxide adducts, and bis(4-β-hydroxyethoxyphenyl)sulfone. Using the other monomer components in too high a proportion can impair the physical properties of the resulting polyethylene terephthalate resin. A recommended amount of the other monomer components is less than 20% by weight, preferably less than 10% by weight, based on the total monomer components.

A polyethylene terephthalate resin for use in the invention can be prepared by any known polymerization method, such as interesterification of dimethyl terephthalate and ethylene glycol. A polyethylene terephthalate resin can also be prepared by directly esterifying terephthalic acid and ethylene glycol to prepare bis(2-hydroxyethyl) terephthalate as a precursor and melt-polymerizing the precursor in the presence of a polycondensation catalyst, such as a germanium compound. Considering that polyester resins of high degree of polymerization are preferred for bottles, it is preferred that the polymer obtained by melt polycondensation be further subjected to solid phase polymerization at temperatures lower than the melting point by 20° to 50° C.

Catalysts for direct esterification that can be used in the production of a polyethylene terephthalate resin include a methylate of sodium or magnesium; zinc borate; fatty acid salts or a carbonate of zinc, cadmium, manganese, cobalt, calcium or barium, such as zinc acetate; metallic magnesium; and an oxide of lead, zinc, antimony or germanium.

A polyethylene naphthalate resin for use in the invention is obtained in the same manner as for the polyethylene terephthalate resin, except for using naphthalenedicarboxylic acid in place of terephthalic acid.

In using a commercially available polyester resin as component (A), it is advisable to use those of container grade. The intrinsic viscosity (I.V.) of the polyester resin (A) preferably ranges from 0.5 to 1.5, still preferably from 0.6 to 1.1. The polyester resin (A) which is non-crystalline preferably has an I.V. of 0.65 to 0.75. The one which is crystalline preferably has an I.V. of 0.7 to 1.05. The one which is a copolymer preferably has an I.V. of 0.7 to 0.8.

In formula (I) representing the triazine ultraviolet absorber as component (B), the alkyl group represented by $R_1$ includes methyl, ethyl, propyl, isopropyl, butyl, sec-butyl, tert-butyl, isobutyl, amyl, isoamyl, tert-amyl, hexyl, 2-hexyl, 3-hexyl, heptyl, 2-heptyl, 3-heptyl, isoheptyl, tert-heptyl, n-octyl, isooctyl, tert-octyl, 2-ethylhexyl, nonyl, isononyl, decyl, dodecyl (lauryl), tridecyl, tetradecyl (myristyl), pentadecyl, hexadecyl (palmityl), heptadecyl, cyclopentyl, 2-cyclopentylethyl, 3-cyclopentylpropyl, 4-cyclopentylbutyl 5-cyclopentylpentyl, cyclohexyl, 2-cyclohexylethyl, 3-cyclohexylpropyl, 4-cyclohexylbutyl, 5-cyclohexylpentyl, 8-cyclohexyloctyl, 10-cyclohexyldecyl, cycloheptyl, cyclooctyl, bicyclohexyl, bicycloheptyl, bicyclooctyl, 2-methylcyclohexyl, 3-methylcyclohexyl, 4-methylcyclohexyl, 2,4-dimethylcyclohexyl, 2,5-dimethylcyclohexyl, 2,6-dimethylcyclohexyl, 3,4-dimethylcyclohexyl, 4,5-dimethylcyclohexyl, 4-ethylcyclohexyl, 4-propylcyclohexyl, 4-isopropylcyclohexyl, 4-butylcyclohexyl, 4-tert-butylcyclohexyl, 4-hexylcyclooctyl, 4-cyclohexyldecyl, (4-methylcyclohexyl)methyl, 2-(4-ethylcyclohexyl)ethyl, and 3-(4-isopropylcyclohexyl)-propyl. Of these alkyl groups preferred are those having 1 to 10 carbon atoms.

Specific but non-limiting examples of the triazine ultraviolet absorbers represented by formula (I) include compound Nos. 1 to 9 listed below.

Compound No. 1:

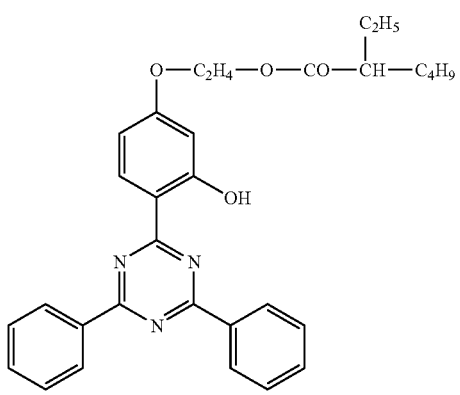

Compound No. 2:

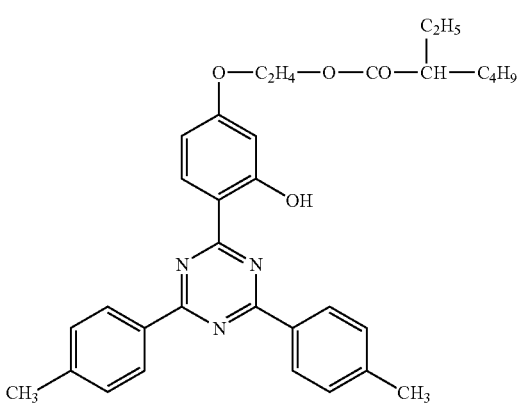

Compound No. 3:

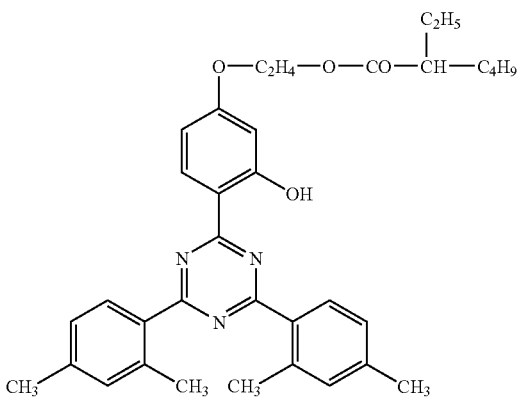

-continued

Compound No. 4:

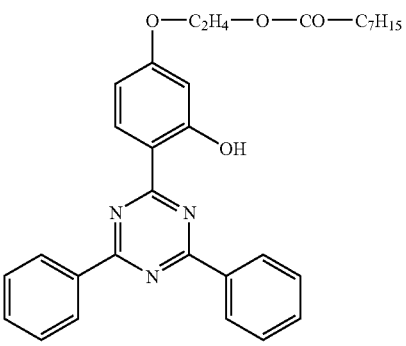

Compound No. 5:

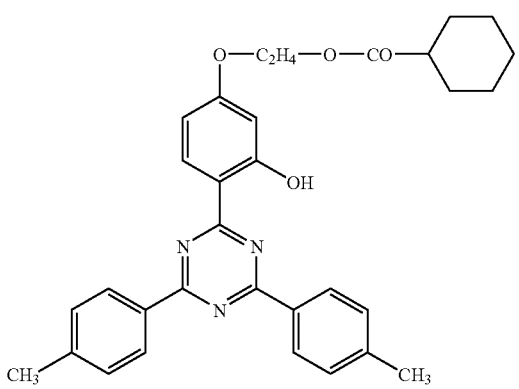

Compound No. 6:

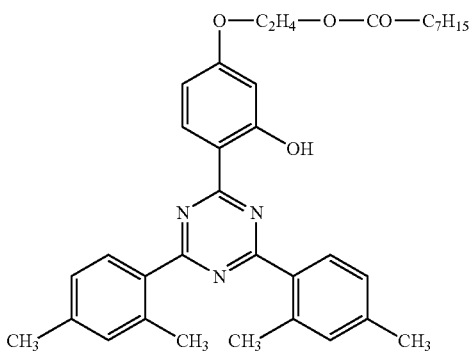

Compound No. 7:

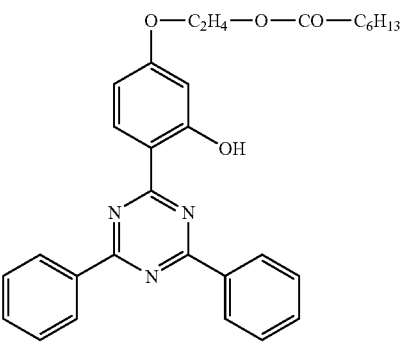

-continued

Compound No. 8:

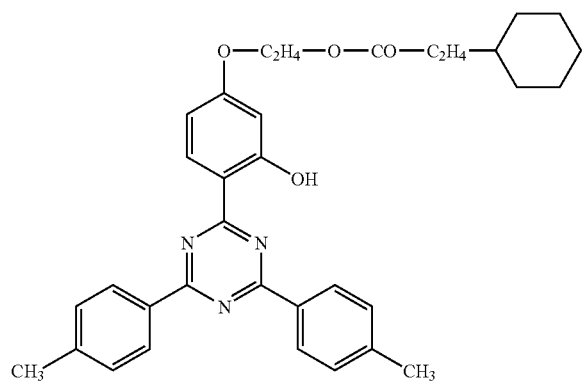

Compound No. 7:

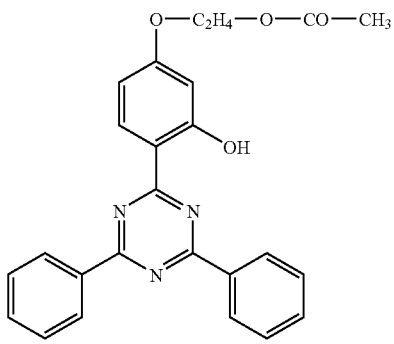

The triazine compound (I) is used as component (B) in an amount of 0.01 to 10 parts by weight, preferably 0.05 to 5 parts by weight, still preferably 0.1 to 3 parts by weight, per 100 parts by weight of the polyester resin (A). At amounts less than 0.01 parts, the compound fails to produce sufficient stabilizing effect. At amounts more than 10 parts, the compound bleeds out or reduces the physical properties of the resin composition, resulting in a reduction of merchantability of the container and the contents.

The triazine compound (I) is not limited by the process of preparation. Useful processes for preparing the triazine compound (I) include esterification or interesterification between 2-[2-hydroxy-4-(2-hydroxyethyloxy)phenyl]-4,6-diphenyl-1,3,5-triazine as an alcohol component and a monocarboxylic acid or an ester-forming derivative thereof (e.g., a halide or an ester). These reactions may be effected either successively or all at once.

Methods for molding a container from the polyester resin composition is not particularly restricted. Useful molding methods include single-stage molding processes, such as extrusion blow molding, injection blow molding, and injection biaxial stretch blow molding (hot parison method); two-stage molding processes, such as extruded preform blow molding and injected preform blow molding; biaxial stretch blow molding processes; and non-stretch molding processes.

Polyethylene terephthalate resin containers may sometimes have insufficient gas barrier properties against oxygen or carbon dioxide. Where there is a fear that liquid contents, e.g., juice undergoes color change or reduction of vitamins, the polyester resin container may be a co-extruded laminate container having an interlayer of an ethylene-vinyl alcohol copolymer (e.g., Eval available from Kuraray Co., Ltd.) or an aromatic polyamide (e.g., MX Nylon available from Mitsubishi Gas Chemical Co., Ltd.).

If desired, the polyester resin composition can contain compounding additives generally used in the art, such as a coloring inhibitor (hereinafter taken as component (C)), a hindered amine light stabilizer, an ultraviolet absorber other than the triazine compound of formula (I), a phosphorus, phenol or sulfur antioxidant, a nucleating agent, a flame retardant, a metal soap, a processing aid, a pigment, a filler, and a lubricant.

The coloring inhibitor as component (C) preferably includes phosphorus-containing antioxidants, particularly phosphorous ester compounds represented by formula (II):

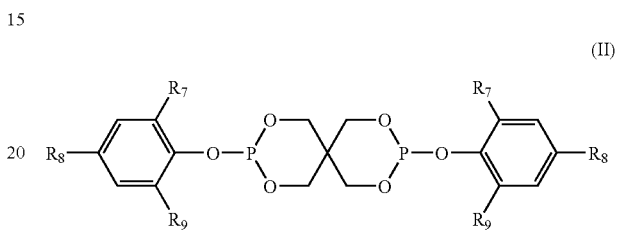

wherein $R_7$ represents an alkyl group having 4 to 8 carbon atoms or an arylalkyl group having 7 to 12 carbon atoms; and $R_8$ and $R_9$ each represent a hydrogen atom, an alkyl group having 1 to 8 carbon atoms or an arylalkyl group having 7 to 12 carbon atoms.

Specific examples of the phosphorous ester compound of formula (II) include bis(2,4-di-tert-butylphenyl) pentaerythritol diphosphite, bis(2,6-di-tert-butyl-4-methylphenyl) pentaerythritol diphosphite, and bis(2,4-dicumylphenyl) pentaerythritol diphosphite. Further included in the coloring inhibitor (C) are phenol type antioxidants and sulfur-containing antioxidants. The coloring inhibitor (C) is preferably used in an amount of 0.01 to 10 parts by weight, still preferably 0.1 to 5 parts by weight, per 100 parts by weight of the polyester resin (A).

Examples of the hindered amine light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis (1,2,2,6,6-pentamethyl-4-piperidyl) sebacate, bis(1-octoxy-2,2,6,6-tetramethyl-4-piperidyl) sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl) bis (tridecyl)-1,2,3,4-butanetetracarboxylate, bis(1,2,2,6,6-pentamethyl-4-piperidyl) bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino) hexane/2,4-dichloro-6-morpholino-s-triazine polycondensate, 1,6-bis(2,2,6,6-tetramethyl-4-piperidylamino)hexane/2,4-dichloro-6-tert-octylamino-2-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8, 12-tetraazadodecane, 1,6,11-tris[2,4-bis(N-butyl-N-(2,2,6,6-tetramethyl-4-piperidyl)amino-s-triazin-6-ylamino] undecane, 1,6,11-tris[2,4-bis(N-butyl-N-(1,2,2,6,6- pentamethyl-4-piperidyl)amino-s-triazin-6-ylamino] undecane, 3,9-bis[1,1-dimethyl-2-[tris(2,2,6,6-tetramethyl-4-piperidyloxycarbonyloxy)butylcarbonyloxy]ethyl]-2,4,8,10-tetraoxaspiro[5.5]undecane, and 3,9-bis[1,1-dimethyl-2-[tris(1,2,2,6,6-pentamethyl-4-piperidyloxycarbonyloxy) butylcarbonyloxy]ethyl]-2,4,8,10-tetraoxaspiro[5.5] undecane.

Examples of the ultraviolet absorber other than the triazine compound of formula (I) include 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2-hydroxyphenyl)benzo-triazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzo-triazole, 2-(2-hydroxy-3-tert-butyl-5-methylphenyl)-5-chlorobenzotriazole, 2-(2-hydroxy-3,5-dicumylphenyl)benzotriazole, 2,2'-methylenebis(4-tert-octyl-6-benzo-triazolylphenol), polyethylene glycol ester of 2-(2-hydroxy-3-tert-butyl-5-carboxyphenyl)benzotriazole, 2-[2-hydroxy-3-(2-acryloyloxyethyl)-5-methylphenyl]-benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole, and 2-[2-hydroxy-4-(3-methacryloyloxypropyl)phenyl]benzotriazole; 2-(2-hydroxyphenyl)-4,6-diaryl-1,3,5-triazines, such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-$C_{12-13}$ mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-di-hydroxy-3-allylphenyl)-4,6-bis(2,4-dimethylphenyl)-1,3,5-triazine, and 2,4,6-tris(2-hydroxy-3-methyl-4-hexyloxyphenyl)-1,3,5-triazine; benzoates, such as phenyl salicylate, resorcinol monobenzoate, 2,4-di-tert-butylphenyl 3,5-di-tert-butyl-4-hydroxybenzoate, octyl (3,5-di-tert-butyl-4-hydroxy)benzoate, dodecyl (3,5-di-tert-butyl-4-hydroxy)benzoate, tetradecyl (3,5-di-tert-butyl-4-hydroxy)benzoate, hexadecyl (3,5-di-tert-butyl-4-hydroxy)benzoate, octadecyl (3,5-di-tert-butyl-4-hydroxy)benzoate, and behenyl (3,5-di-tert-butyl-4-hydroxy)benzoate; substituted oxanilides, such as 2-ethyl-2'-ethoxyoxanilide and 2-ethoxy-4'-dodecyloxanilide; cyanoacrylates, such as ethyl α-cyano-β,β-diphenylacrylate and methyl 2-cyano-3-methyl-3-(p-methoxyphenyl)acrylate; and metal salts or chelates, particularly nickel or chromium salts or chelates.

Examples of the phosphorus-containing antioxidant include triphenyl phosphite, tris(2,4-di-tert-butylphenyl) phosphite, tris(2,5-di-tert-butylphenyl) phosphite, tris(nonylphenyl) phosphite, tris(dinonylphenyl) phosphite, tris (mono-/di-mixed nonylphenyl) phosphite, diphenyl acid phosphite, 2,2'-methylenebis(4,6-di-tert-butylphenyl) octyl phosphite, diphenyl decyl phosphite, diphenyl octyl phosphite, di(nonylphenyl) pentaerythritol diphosphite, phenyl diisodecyl phosphite, tributyl phosphite, tris(2-ethylhexyl) phosphite, tridecyl phosphite, trilauryl phosphite, dibutyl acid phosphite, dilauryl acid phosphite, trilauryl trithiophosphite, bis(neopentyl glycol) 1,4-cyclohexanedimethyl diphosphite, bis(2,4-di-tert-butylphenyl) pentaerythritol diphosphite, bis(2,5-di-tert-butylphenyl) pentaerythritol diphosphite, bis(2,6-di-tert-butyl-4-methylphenyl) pentaerythritol diphosphite, bis(2,4-dicumylphenyl)pentaerythritol diphosphite, distearyl pentaerythritol diphosphite, tetra ($C_{12-15}$-mixed alkyl)-4,4'-isopropylidenediphenyl phosphite, bis[2,2'-methylenebis(4,6-diamylphenyl)] isopropylidenediphenyl phosphite, tetratridecyl 4,4'-butylidenebis(2-tert-butyl-5-methylphenol) diphosphite, hexa (tridecyl).1,1,3-tris(2-methyl-5-tert-butyl-4-hydroxyphenyl) butane-triphosphite, tetrakis(2,4-di-tert-butylphenyl) biphenylene diphosphonite, tris(2-[(2,4,7,9-tetrakis-tert-butyldibenzo[d,f][1,3,2]dioxaphosphepin-6-yl)oxy]ethyl) amine, 9,10-dihydro-9-oxa-10-phosphaphenanthrene-10-oxide, and 2-butyl-2-ethylpropanediol 2,4,6-tri-tert-butylphenol monophosphite.

Examples of the phenol type antioxidant include 2,6-di-tert-butyl-p-cresol, 2,6-diphenyl-4-octadecyloxyphenol, stearyl (3,5-di-tert-butyl-4-hydroxyphenyl)propionate, distearyl (3,5-di-tert-butyl-4-hydroxybenzyl)phosphonate, tridecyl 3,5-di-tert-butyl-4-hydroxybenzyl thioacetate, thiodiethylenebis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid] glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)-phenyl] terephthalate, 1,3,5-tris (2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)-propionyloxyethyl]isocyanurate, tetrakis[methylene-3-(3', 5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydro-cinnamoyloxy)-1,1-dimethylethyl]-2,4,8,10-tetraoxaspiro[5.5]undecane, and triethylene glycol bis[β-(3-tert-butyl-4-hydroxy-5-methylphenyl)propionate].

Examples of the sulfur-containing antioxidant include dialkyl thiodipropionates, such as a dilauryl, dimyristyl, myristylstearyl or distearyl ester of thiodipropionic acid; and polyol β-alkylmercaptopropionic acid esters, such as pentaerythritol tetra(β-dodecylmercaptopropionate).

The amount of these additives to be added is preferably 0.001 to 10 parts by weight, still preferably 0.01 to 5 parts by weight, per 100 parts by weight of the polyester resin (A).

The polyester resin container of the present invention can have any desired shape and includes bottles, trays, and boxes. The polyester resin container of the invention finds the most application in food packaging. The container is especially suitable as a container of liquid foods including juices, carbonated beverages, teas, seasonings, edible oils, and alcoholic beverages. The container is also applicable to packaging non-foods such as detergents or as an industrial container.

The polyester resin container of the invention can be filled or stored not only under ambient temperature and atmospheric pressure conditions but under pressure or reduced pressure or at high temperature. The polyester resin container of the invention may be subjected to heat sterilization in a usual manner.

The polyester resin container of the invention preferably has a weatherability of at least 7,000 hours, still preferably 8,000 hours or longer, in a weathering test hereinafter described. A container with a weatherability shorter than 7,000 hours is liable to break before the expiration date due to the failure to maintain its mechanical strength or to lose its merchantability due to the failure to maintain its color tone. The polyester resin container of the invention is preferably water-white (colorless). Otherwise, the contents might look different from what they naturally are, which can impair the merchantability.

The present invention will now be illustrated in greater detail with reference to Examples, but it should be understood that the invention is not deemed to be limited thereto. Unless otherwise noted, all the percents are parts by weight.

The components used in Examples and Comparative Examples are shown below.

1) Polyester resin
   Polyethylene terephthalate (TR-8550, available from Teijin Ltd.)
2) Coloring inhibitor
   Bis(2,6-di-tert-butyl-4-methylphenyl) pentaerythritol diphosphite
3) Hindered amine light stabilizer (hereinafter abbreviated as HALS)
   Tetrakis(1,2,2,6,6-pentamethyl-4-piperidyl) 1,2,3,4-butanetetracarboxylate
4) Ultraviolet absorber
   The triazine compounds of formula (I) and comparative compound Nos. 1 to 4 shown below.

Comparative Compound No. 1

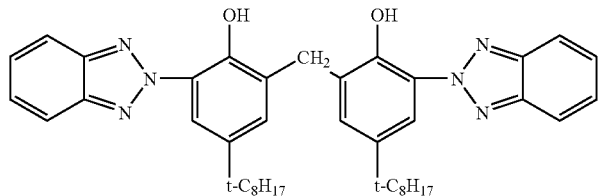

Comparative Compound No. 2

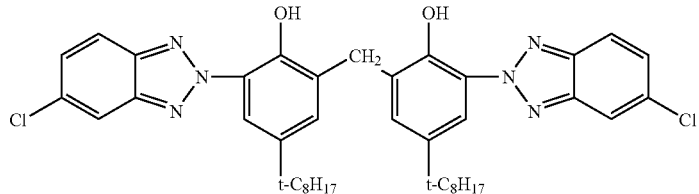

Comparative Compound No. 3

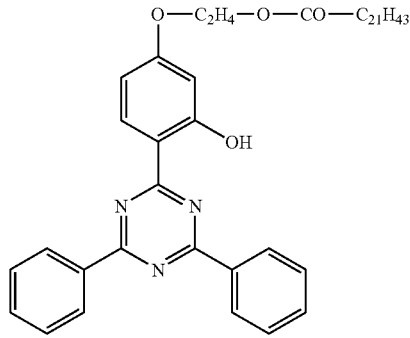

Comparative Compound No. 4

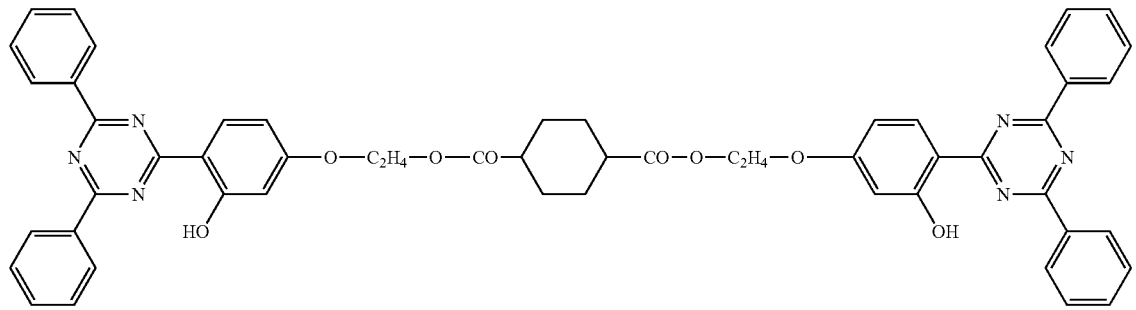

EXAMPLES 1 TO 8 AND COMPARATIVE EXAMPLES 1 TO 6

A hundred parts of the polyester resin, 0.1 parts of the ultraviolet absorber shown in Table 1 below, 0.1 parts of the HALS (in Examples 3 and 8 and Comparative Example 2), and 0.05 parts of the coloring inhibitor were compounded. The resulting compound was blown molded to obtain 700 ml volume bottles. Blow molding was carried out using a direct blow molding machine JEB-7/P50/WS60S supplied by The Japan Steel Works, Ltd. at a cylinder temperature of 280° C., a mold temperature of 15° C., and a cycle time of 13 seconds. The resulting bottles were evaluated for weatherability and colorlessness in accordance with the following test methods. The results obtained are shown in Table 1.

1) Weathering test

Five pieces of 2 cm wide and 4 cm long were cut out of the side wall of the bottle and acceleratedly aged in a sunshine weatherometer. The time required until the haze became 50% was taken as a weatherability.

2) Coloring test

The five cut pieces after being subjected to the weathering test were stacked up, and the color tone of the stack was observed with the naked eye.

TABLE 1

| | UV Absorber | Wavelength* (nm) | HALS | Weatherability (hr) | Coloration |
|---|---|---|---|---|---|
| Example 1 | Compound No. 1 | 343, 280 | no | 10500 | colorless |
| Example 2 | Compound No. 2 | 343, 292 | no | 9500 | colorless |
| Example 3 | Compound No. 2 | 343, 292 | yes | 10500 | colorless |
| Example 4 | Compound No. 3 | 340, 295 | no | 9200 | colorless |
| Example 5 | Compound No. 5 | 343, 292 | no | 9500 | colorless |
| Example 6 | Compound No. 7 | 343, 280 | no | 9200 | colorless |
| Example 7 | Compound No. 9 | 343, 280 | no | 9800 | colorless |
| Example 8 | Compound No. 9 | 343, 280 | yes | 10000 | colorless |
| Compara. Example 1 | — | — | no | 400 | yellow |
| Compara. Example 2 | — | — | yes | 1700 | yellow |
| Compara. Example 3 | Comparative Compound No. 1 | 350, 305 | no | 8200 | colorless |
| Compara. Example 4 | Comparative Compound No. 2 | 357, 315 | no | 3200 | colorless |
| Compara. Example 5 | Comparative Compound No. 3 | 343, 280 | no | 3700 | colorless |
| Compara. Example 6 | Comparative Compound No. 4 | 343, 280 | no | 3800 | colorless |

*The absorption maximum wavelengths of the UV absorber

As is apparent from Table 1, the containers of Examples 1 to 8 containing the specific ultraviolet absorber of the invention are protected from coloration and exhibit superiority to comparative containers in weatherability and are therefore fit for use as containers.

The containers of Examples 1 to 8 were heat sterilized in a usual manner to be confirmed to have satisfactory heat resistance enough to withstand heat sterilization.

As described hereinabove, the present invention provides a sanitary polyester resin container exhibiting improved weatherability without causing coloring of polyester resin nor involving bleeding of additives and therefore suitable as a food container for packaging beverages, etc.

What is claimed is:

1. A blown bottle made of a polyester resin composition comprising (A) 100 parts by weight of a polyester resin, (B) 0.01 to 10 parts by weight of a triazine ultraviolet absorber represented by formula (1):

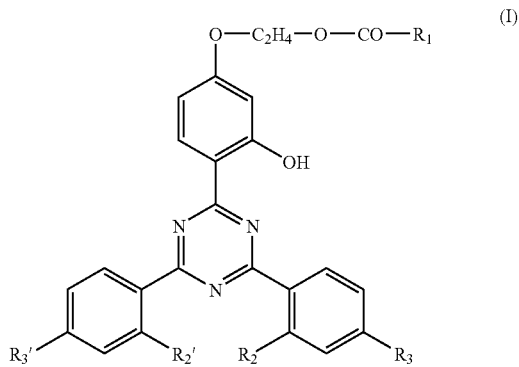

wherein $R_1$ represents a straight-chain or branched alkyl group having 1 to 17 carbon atoms; and $R_2$, $R_2'$, $R_3$, and $R_3'$ each represent a hydrogen atom or a methyl group; (C) a phosphorous ester compound; and (D) a hindered amine light stabilizer.

2. The blown bottle according to claim 1, which is a heat sterilized, food packaging container.

3. The blown bottle according to claim 1, wherein the hindered amine light stabilizer is tetrakis (1,2,2,6, 6-pentamethyl-4-piperidyl)-1,2,3,4-butanetetracarboxylate.

* * * * *